United States Patent
Vincent

(10) Patent No.: US 6,443,718 B1
(45) Date of Patent: Sep. 3, 2002

(54) SHUTTLE VALVE FOR CONCRETE PUMP

(75) Inventor: Darrell M. Vincent, Oceanside, CA (US)

(73) Assignee: Multiquip, Inc., Carson, CA (US)

( * ) Notice: Subject to any disclaimer, the term of this patent is extended or adjusted under 35 U.S.C. 154(b) by 0 days.

(21) Appl. No.: 09/503,639

(22) Filed: Feb. 14, 2000

(51) Int. Cl.[7] ............. F04B 7/00; F04B 15/02; F16K 25/00
(52) U.S. Cl. ............. 417/518; 417/516; 417/517; 417/532; 417/900; 251/179
(58) Field of Search .............. 417/516, 517, 417/518, 532, 900; 251/179

(56) References Cited

U.S. PATENT DOCUMENTS

| 3,682,575 A | 8/1972 | Guddal et al. ............. 417/517 |
| 3,909,160 A | 9/1975 | Sherrod ............. 417/517 |
| 4,178,142 A | 12/1979 | Schwing ............. 417/516 |
| 4,198,193 A | 4/1980 | Westerlund et al. ............. 417/517 |
| 4,337,017 A | 6/1982 | Evenson ............. 417/516 |
| 4,465,441 A | 8/1984 | Schwing ............. 417/517 |
| 4,556,370 A | * 12/1985 | Schwing ............. 417/517 |
| 4,614,483 A | * 9/1986 | Hudelmaier ............. 417/517 |
| 5,037,275 A | * 8/1991 | Schlecht ............. 417/517 |
| 5,746,247 A | 5/1998 | Schlecht et al. ......... 137/625.45 |

FOREIGN PATENT DOCUMENTS

EP          171796 A2  *  2/1986  ............. 417/517

* cited by examiner

Primary Examiner—Charles G. Freay
Assistant Examiner—Timothy P. Solak
(74) Attorney, Agent, or Firm—Frank J. Dykas; Stephen M. Nipper; Robert L. Shaver

(57) ABSTRACT

A shuttle valve for use in a pumping apparatus for pumping concrete or the like. The valve uses belleville springs to hold a wear ring against the concrete hopper, thereby creating a seal.

4 Claims, 3 Drawing Sheets

SHUTTLE VALVE FOR CONCRETE PUMP

BACKGROUND OF THE INVENTION

1. Field of the Invention

The present invention generally relates to concrete pumping apparatus, and more particularly to a shuttle valve having an improved wear ring assembly.

2. Background Information

Concrete pumps have been in use for a number of years and are generally of a common design which utilizes a feed hopper into which wet concrete is dumped. Either attached to the side of the hopper near the bottom of the hopper, or to the bottom of the hopper itself, is a wear plate having at least two openings therethrough. Attached to the other side of the hopper, in alignment with the wear plate openings, are two hydraulic rams which alternately draw wet concrete from the hopper and then alternately pump this concrete through a transmission conduit which is attached to a slidable shuttle valve which alternately aligns and registers with the discharge conduit of the hydraulic ram at the beginning its output throw of the pumping cycle. This type of prior art concrete pumping apparatus is described in U.S. Pat. Nos. 4,198,193 and 4,337,017, the teachings of which are herein incorporated by reference.

The problem is, as can be seen in the incorporated prior art references, there is a slidable plate, commonly called the nun plate which slides back and forth over the two openings in the wear plate. A seal must be provided between the slidable plate and the wear plate in spite of the fact that wet concrete is a very abrasive substance. The seal between the slidable plate and the wear plate is normally provided by a wear ring which acts as a seal with the wear plate and a shear-type guillotine valve to push aside or cut through the mixture of concrete as it opens up each cylinder alternately to either the hopper or the pressure outlet. This requires a predetermined contact pressure between the wear ring and the wear plate which is compromised by any wear between these parts. In fact, the environment is so abrasive that the contact between the wear ring and the wear plate is only ideal for the first few hours of operation. There is constant wear and degradation that is only corrected by new parts or by continuous mechanical adjustment. If an operator fails to continuously mechanically adjust the seal between the wear ring and the wear plate, the rate of degradation increases as the wear occurs since more of the abrasive wet concrete can be found between the wear ring and the wear plate. Failure to maintain a proper seal will result in premature failure of the pump as the guillotine action degrades and the leaking wet concrete wears out the wear plate and the seal. This is an especially acute problem with mechanical type adjustments such as set screws and the like, since not all pump operators are as conscientious as others and will oftentimes overlook the need to readjust or replace the wear ring as needed.

In the prior art, others have attempted to use hydraulic pressure either from the wet concrete itself, or hydraulic fluid as a means of sealing. However, this has not proved satisfactory in that the environment is so abrasive that wet concrete does not provide an adequate seal, and the hydraulic systems are subject to leaks which contaminates the concrete.

Accordingly, it is an object of the present invention to provide a means of spring loading the wear ring against the wear plate in order to provide a continuous, automatic, adjustment of the position of the wear ring relative to the wear plate as the wear ring is abraded away.

Additional objects, advantages and novel features of the invention will be set forth in part in the description as follows, and in part will become apparent to those skilled in the art upon examination of the following, or may be learned by practice of the invention. The objects and advantages of the invention may be realized and attained by means of the instrumentalities and combinations particularly pointed out in the appended claims.

SUMMARY OF THE INVENTION

These objects are achieved by use of a shuttle valve which has a wear plate attached to a side wall of a hopper and a pivotal nun plate which pivots about a driven shaft. The wear plate is provided with two annular openings which are aligned and register with the openings to a pair of hydraulic cylinders. Each of the hydraulic cylinders has a hydraulically driven piston which alternately draws wet concrete from the hopper and then alternately pumps this concrete through the annular openings in the wear plate and through a nun plate annular opening into a flexible conduit.

The flexible conduit is bonded to a conduit collar which is attached to the nun plate by means of tap screws. The conduit collar can be formed of a variety of materials but in the preferred embodiment is of a rigid material so as to provide a flanged surface which reduces the size of the nun plate annular opening to one conforming to the annular size of the annular openings in the wear plate. This flange is used to hold a plurality of belleville springs in compression against the wear ring.

A wear ring is provided for slidable engagement against the surface of the wear plate and is held in slidable engagement by means of the belleville springs. In the manner the belleville springs provide constant, automatic adjustment to maintain the original contact pressure between the two wearing parts, namely the wear plate and the wear ring.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive.

DESCRIPTION OF THE PREFERRED EMBODIMENTS

Figure 1:
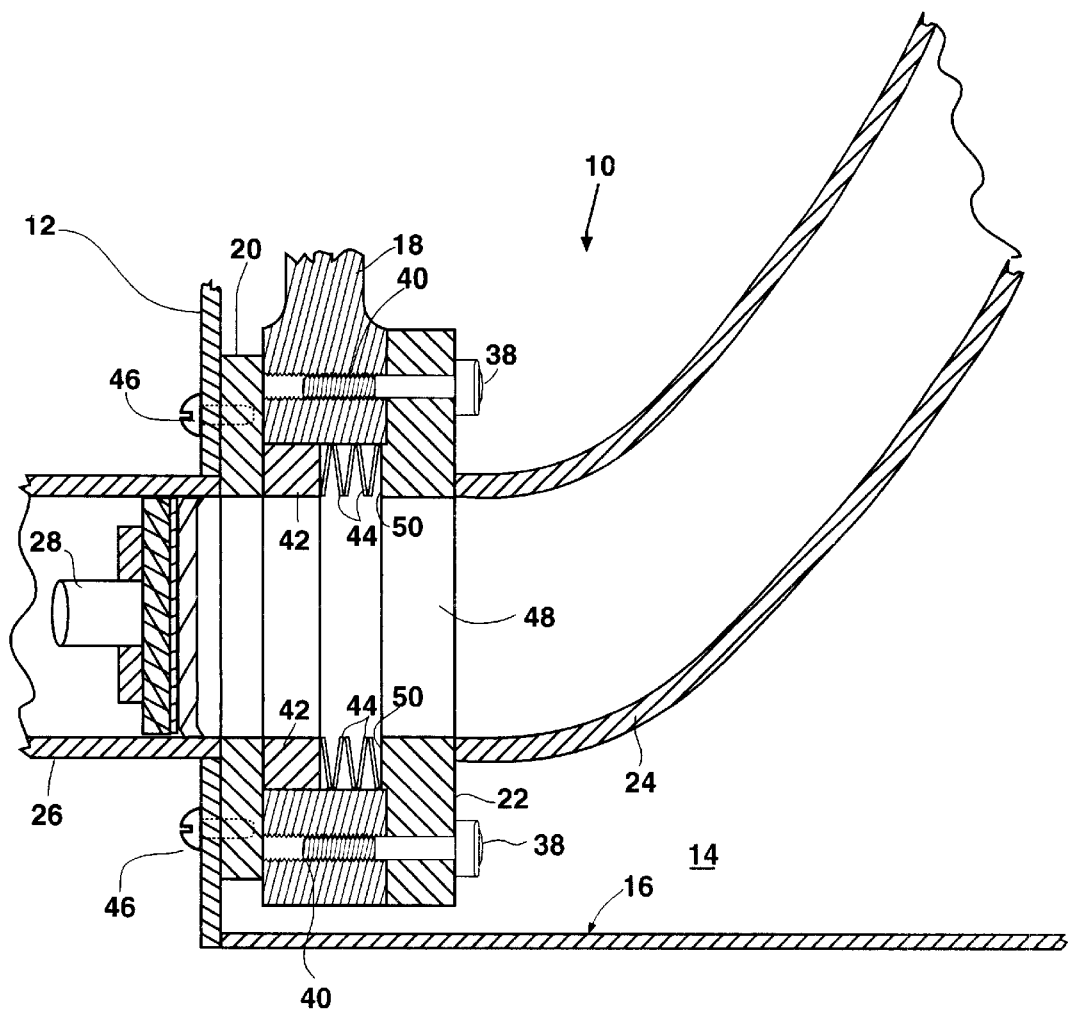
FIG. 1 is a representational sectional side view of the improved shuttle valve showing the spring loaded wear ring.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

Figure 2:
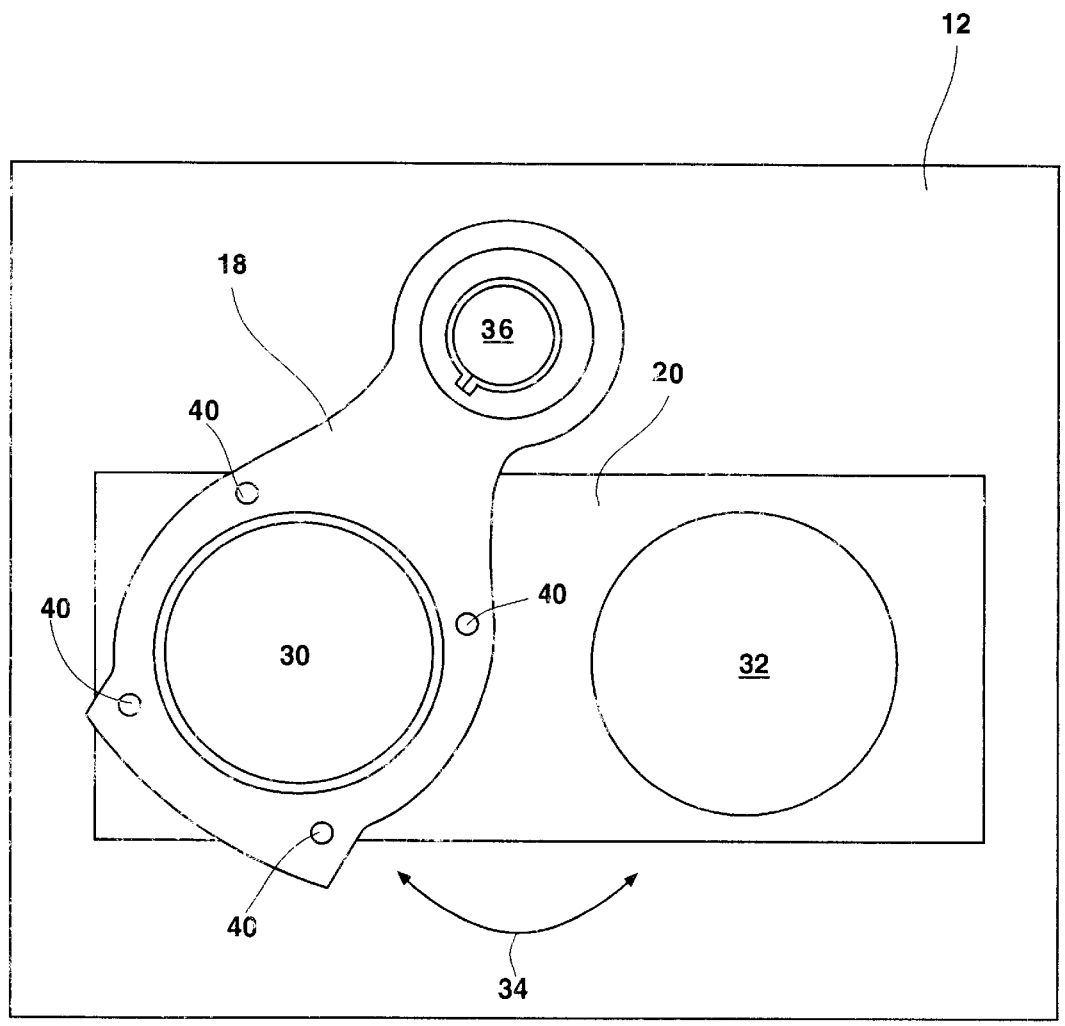
FIG. 2 is a representational front plan view of the shuttle valve in a partially disassembled state.
Figure 3:
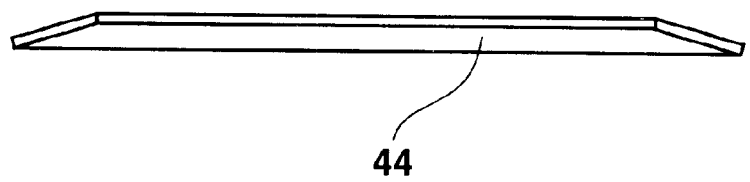
FIG. 3 is a side view of a belleville spring.
Figure 4:
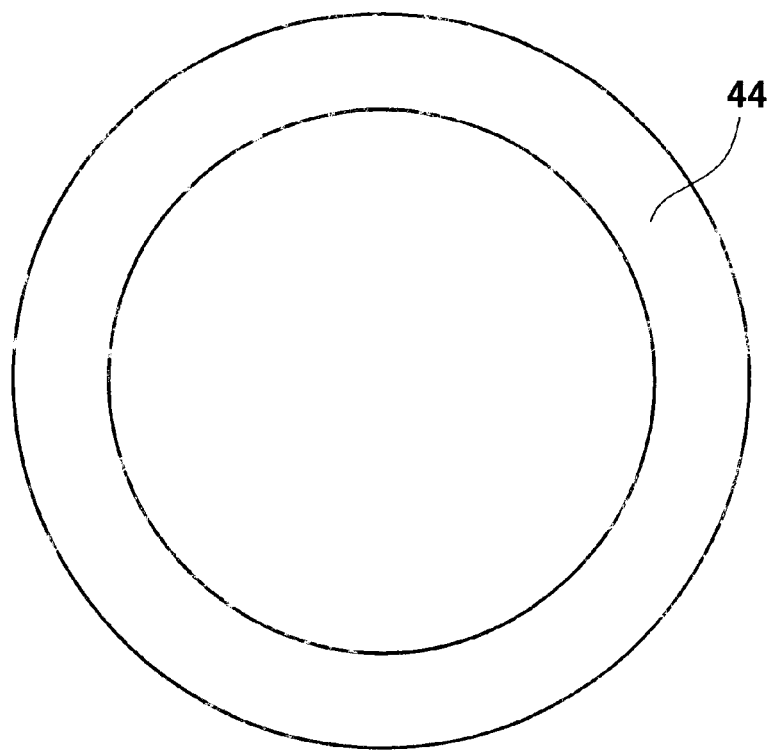
FIG. 4 is a top plan view of the belleville spring.

First referring to FIGS. 1 and 2, there is shown representationally, a shuttle valve 10 for use with a concrete pump. It is attached to hopper 14 which has side wall 12 and bottom wall 16 to which a wear plate 20 is attached by means of screws 46. It is provided with pivot shaft 36 which extends through side wall 12, and pivotal nun plate 18 which pivots with shaft 36 in the directions of arrow 34.

Wear plate 20 is provided with two annular openings 30 and 32, which are aligned and register with the openings to a pair of hydraulic cylinders 26. Each of the hydraulic cylinders 26 has a hydraulically driven piston 28 which alternately draws wet concrete from the hopper 14 and then alternately pumps this concrete through annular openings 30 and 32 through nun plate annular opening 48 into flexible conduit 24.

The mechanical or hydraulic connections pivoting nun plate 18 to its power source are numerous and varied and all well known in the art and play no part in this invention.

Flexible conduit 24 is bonded to a conduit collar 22 which is attached to nun plate 18 by means of tap screws 38 threaded into threaded holes 40 in nun plate 18. Conduit collar 22 can be formed of a variety of materials but in this preferred embodiment, it is formed of rigid material so as to provide flanged surface 50 which reduces the size of nun plate annular opening to one conforming to the annular size of annular openings in 30 and 32 in wear plate 20. It is used to hold belleville springs 44 in compression against wear ring 42.

Wear ring 42 is provided for slidable engagement against the surface of wear plate 20 and is held in slidable engagement by means of a plurality of belleville springs 44. In this manner, the belleville springs provide constant automatic adjustment to maintain the original contact pressure between the two wearing parts, namely the wear plate 20 and wear ring 42.

Belleville springs are commonly used in heavy load and limited travel applications. They are ideal for the preferred embodiment, however it should apparent to those skilled in the art that a number of other types of springs could also be used with varying degrees of success.

While there is shown and described the present preferred embodiment of the invention, it is to be distinctly understood that this invention is not limited thereto but may be variously embodied to practice within the scope of the following claims.

I claim:

1. An improved shuttle valve, said valve connecting between a concrete hopper at a wear plate having an annular opening and an outer surface, and a flexible conduit at a conduit collar, wherein said valve further comprises:
   a pivotable nun plate having a nun plate annular opening therethrough, configured for registry with said wear plate annular opening, said nun plate pivotally held against said wear plate, said nun plate attaching to said conduit collar, thereby forming an annular collar flange within said nun plate opening;
   at least one wear ring having an annular opening therethrough of conforming size to the annular openings in said wear plate, and configured for close but slideable engagement of its outer ring surface within said nun plate annular opening and said surface of said plate; and
   at least one spring means positioned between and in compressive engagement with said annular collar flange and said wear ring so as to keep said wear ring in compressive, slideable engagement with said wear plate.

2. The improved shuttle valve of claim 1 wherein said spring means are belleville springs.

3. In a pumping apparatus for pumping concrete or the like, an improved shuttle valve which comprises:
   a hopper for holding a supply of concrete or the like, said hopper having a side wall;
   a wear plate having two annular openings therethrough, each sized and configured for registry with a cylinder of a hydraulically powered ram for pumping concrete or the like therethrough;
   an elongated pivotable nun plate having a nun plate annular opening therethrough, configured for registry with each of the two annular openings in said wear plate as the nun plate is reciprocally pivoted from a first position to a second position, pivotably held in slidable engagement against said wear plate;
   a flexible conduit having a collar, said collar being attached to said nun plate, said collar being configured to form an annular collar flange within said nun plate opening and a reduced nun plate annular opening of conforming size to the annular openings in said wear plate;
   a wear ring having an annular opening therethrough of conforming size to the annular openings in said wear plate, and configured for close but slideable engagement of its outer ring surface within the nun plate annular opening, and the surface of the wear plate;
   a plurality of belleville springs positioned between and in compressive engagement with said annular collar flange and said wear ring so as to keep said wear ring in compressive, slideable, engagement with the wear plate; and
   means for pivoting said nun plate back and forth between said first position to said second position.

4. A shuttle valve for use in a pumping apparatus for pumping concrete comprising:
   a wear plate having two annular openings therethrough, each sized and configured for registry with a cylinder of a hydraulically powered ram for pumping concrete or the like therethrough;
   an elongated pivotable nun plate having a nun plate annular opening therethrough, configured for registry with each of the two annular openings in said wear plate as the nun plate is reciprocally pivoted from a first position to a second position, pivotably held in slidable engagement against said wear plate;
   a flexible conduit having a collar, said collar being attached to said nun plate, said collar being further configured to form an annular collar flange within said nun plate opening and a reduced nun plate annular opening of conforming size to the annular openings in said wear plate;
   a wear ring having an annular opening therethrough of conforming size to the annular openings in said wear plate, and configured for close but slideable engagement of its outer ring surface within the nun plate annular opening, and the surface of the wear plate;
   at least one spring positioned in compressive engagement against said annular collar flange and said wear ring so as to maintain said wear ring in compressive, slideable, engagement with the wear plate; and
   means for pivoting said nun plate back and forth between said first position to said second position.

* * * * *